United States Patent
Sakuma et al.

[19]

[11] Patent Number: 5,917,263
[45] Date of Patent: Jun. 29, 1999

[54] SWITCHED RELUCTANCE MOTOR

[75] Inventors: Masafumi Sakuma, Chiryu; Akemi Ookawa, Chita-gun, both of Japan

[73] Assignee: Aisin Seiki Kabushiki Kaisha, Kariya, Japan

[21] Appl. No.: 08/873,193

[22] Filed: Jun. 11, 1997

[30] Foreign Application Priority Data

Jun. 11, 1996 [JP] Japan .................................. 8-149184

[51] Int. Cl.⁶ .......................... H02K 19/10; H02K 1/22
[52] U.S. Cl. ......................... 310/261; 310/51; 310/168; 310/264
[58] Field of Search .................................... 310/162, 168, 310/264, 165, 166, 169, 170, 171, 190, 192, 269, 51; 318/701

[56] References Cited

U.S. PATENT DOCUMENTS 5,418,415  5/1995  Ishizaki .................................. 310/162

FOREIGN PATENT DOCUMENTS

| 4306327 | 9/1994 | Germany | H02K 29/06 |
| 58-157358 | 9/1983 | Japan | H02K 29/00 |
| 05316701 | 11/1993 | Japan | H02K 1/06 |
| 07336917 | 4/1996 | Japan | H02K 21/14 |
| WO8606891 | 11/1986 | WIPO | H02K 19/06 |

*Primary Examiner*—Nestor Ramirez
*Assistant Examiner*—B. Mullins
*Attorney, Agent, or Firm*—Sughrue, Mion, Zinn Macpeak & Seas, PLLC

[57] ABSTRACT

In a switched reluctance motor, the projected poles of a rotor have feeble-magnetic portions each having a shape that extends radially inward approximately in the rotational direction from a position relative close to a radially outer end of the projected pole and to an end of the projected pole facing in a counter-rotational direction, that is, a direction opposite to the rotational direction, or a shape that has a side extending radially inward approximately in the rotational direction from a position relatively close to a radially outer end and an counter-rotational direction-facing end of the projected pole and that extends radially inward approximately in the counter-rotational direction. The feeble-magnetic portions are weaker in magnetism than the material of the rotor and reduce the magnetic attraction force occurring at the time of switching of coil energization, thereby reducing noises while ensuring generation of a desired amount of torque.

10 Claims, 6 Drawing Sheets

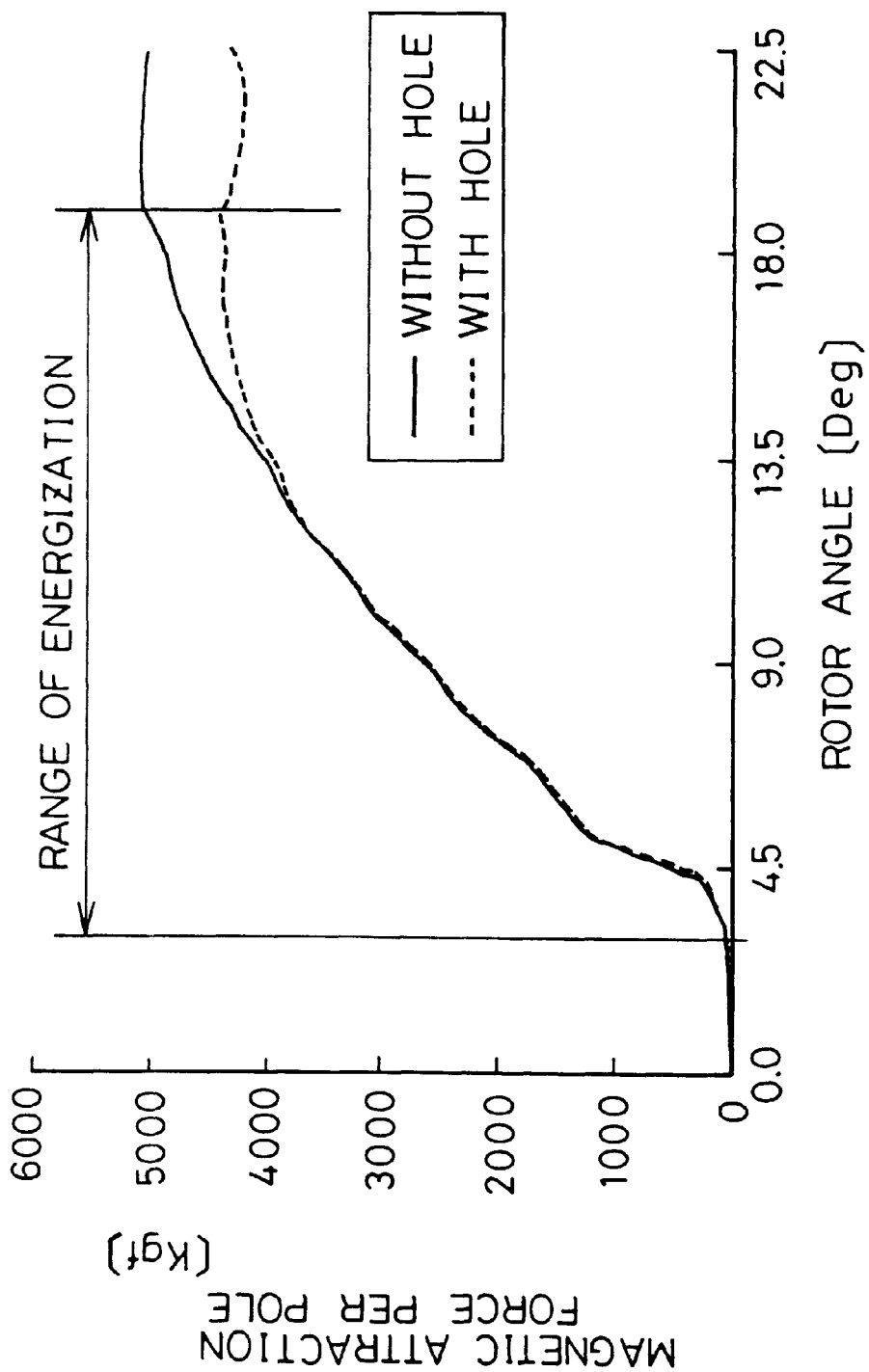

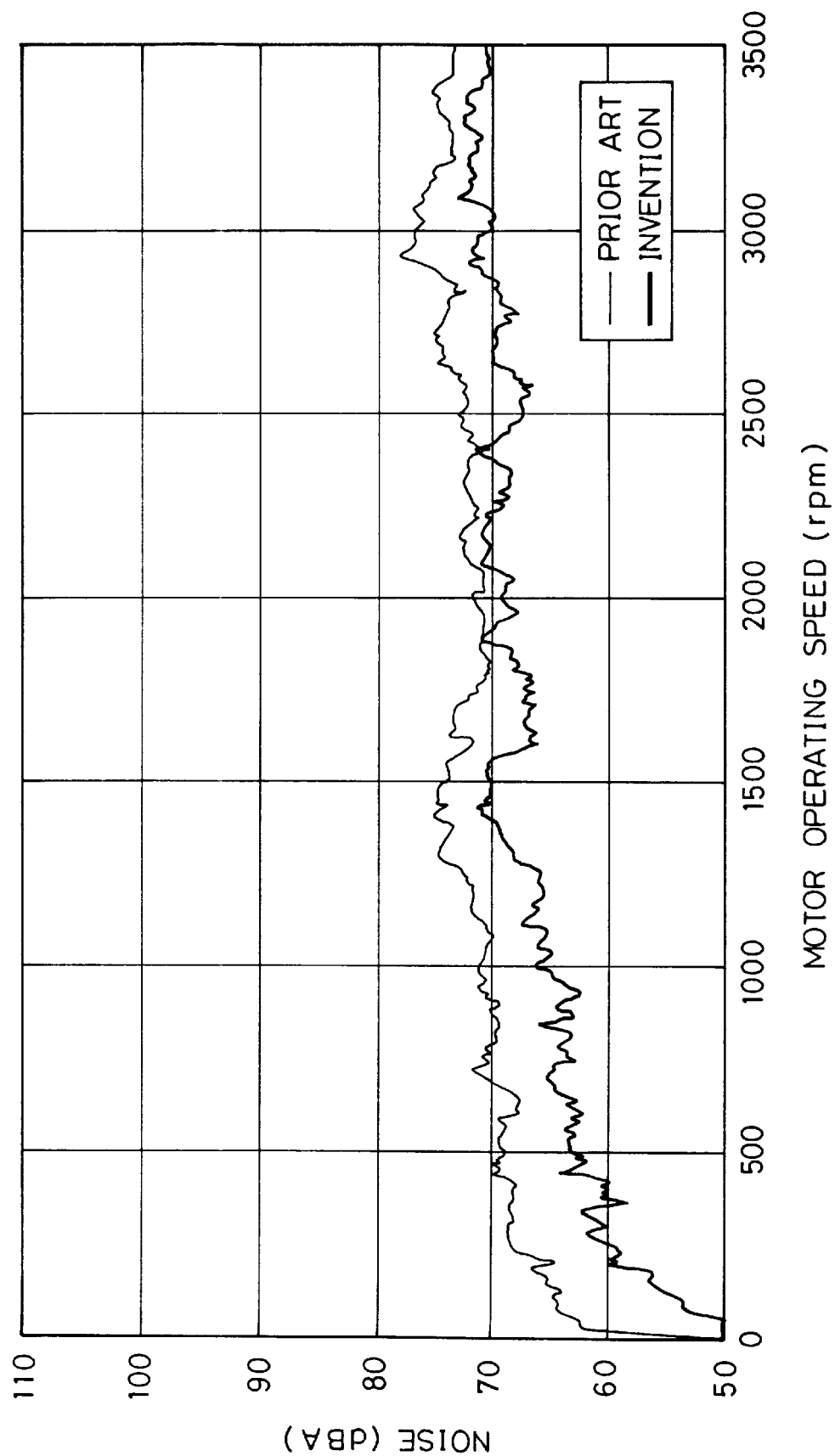

SWITCHED RELUCTANCE MOTOR

BACKGROUND OF THE INVENTION

1. Field of the Invention

The present invention relates to a switched reluctance motor that is operated mainly in a specific rotational direction and is suitable for use as, for example, a power source for an electric vehicle.

2. Description of the Related Art

A typical switched reluctance motor (hereinafter referred to as "SR motor") has a ring-like stator having a plurality of pole portions that are disposed in a cylindrical arrangement and provided with coil windings, and a rotor rotatably disposed inside the stator and provided with projected poles that face the pole portions of the stator. The rotor is normally an iron core formed simply by stacking magnetic material plates such as iron or steel plates or the like. The coils and pole portions act as electromagnets to attract the projected poles of the rotor. The rotor continuously rotates by switching the coils to be energized synchronously with the rotation of the rotor.

This type of SR motor is disclosed in Japanese Patent Laid-Open No. Sho 48(1973)-77314, Japanese Patent Laid-Open No. Sho 61(1986)-203847 and U.S. Pat. No. 3,956,678.

The SR motor, which generates torque by exploiting magnetic attraction forces created between the magnetic poles of the rotor and the stator by energization of the coils, normally produces considerable vibrations during rotation. This is because in a cycle of energization, the magnetic attraction force in a radial direction increases with rotation of the rotor, reaches a maximum and abruptly discontinues at energization switching, so that vibrations in the radial direction are produced in both the rotor and the stator and propagate to other components.

The technology disclosed in U.S. Pat. No. 3,956,678 incorporates a plurality of slit zones formed on the sides of projected poles facing in a specific rotational direction of the rotor, in order to specify the rotational direction of the SR motor at the time of starting. Although this technology reduces the magnetic attraction force occurring at the time of energization switching, the technology also considerably reduces the torque output.

SUMMARY OF THE INVENTION

Accordingly, it is an object of the present invention to reduce the magnetic attraction force at the time of energization switching in a switched reluctance motor with a simple construction while ensuring generation of a desired amount of torque.

According to the present invention, there is provided a switched reluctance motor, operated mainly in a specific rotational direction, having a stator provided with a plurality of pairs of pole portions that extend substantially in the direction of an axis of the stator and are projected radially inward in such a manner that each pair of pole portions are located opposite each other, a rotor rotatably disposed inside the stator, and a plurality of coils wound around the plurality of pairs of the pole portions of the stator. The rotor has a plurality of pairs of projected poles that extend substantially in the direction of an axis of the rotor and that are projected radially outward so that the projected poles may face the pole portions of the stator while maintaining a predetermined clearance therefrom. A feeble-magnetic portion that is weaker in magnetism than the material of the rotor is formed in each of the projected poles of the rotor, in a shape extending radially inward approximately in the rotational direction from a position relatively close to a radially outer end of the projected pole and to an end of the projected pole facing in a counter-rotational direction, that is, a direction opposite to the rotational direction, or a shape that has a side extending radially inward approximately in the rotational direction from a position relatively close to a radially outer end of the projected pole and to an end of the projected pole facing in a counter-rotational direction, that is, a direction opposite to the rotational direction.

The feeble-magnetic portion may be a groove or a hole formed in a projected pole of the rotor. Furthermore, the feeble-magnetic portion may be formed as a groove or a hole formed in a projected pole of the rotor with a non-magnetic high-electric resistance member extending through the groove or the hole. Further, the feeble-magnetic portion may be provided at a counter-rotational direction-facing end side of a projected pole of the rotor.

It is also possible to form the rotor by stacking a plurality of plates and forming the feeble-magnetic portion as a combination of a groove or a hole formed in a projected pole of the rotor with a non-magnetic high-electric resistance member extending through the groove or the hole, in such a manner that the feeble-magnetic portion extends through the plates.

With the construction described above, a magnetic attraction force is caused between the projected poles of the rotor and the pole portions of the stator by energizing the coils, so that the rotor rotates. The rotor rotation is continued by switching the coils to be energized.

In an operational stage up to the moment when a rotational direction-facing end portion of a projected pole of the rotor overlaps (faces) an end portion of a pole portion of the stator, the magnetic flux concentrates in the end portions of the rotor and the stator, thereby producing a torque and a magnetic attraction force substantially independently of whether a feeble-magnetic portion is provided. As the rotor further rotates the projection pole of the rotor further overlaps the pole portion of the stator, that is, the areas of the projected pole and the pole portion facing each other increase so that the magnetic attraction force increases. However, the increase of the magnetic flux contributing to the increase of the magnetic attraction force is curbed by the feeble-magnetic portion. Therefore, when a counter-rotational direction-facing end portion of the projected pole of the rotor overlaps the end portion of the pole portion of the stator, the magnetic flux extending through the projected pole of the rotor is blocked or interfered with by the feeble-magnetic portion thereby curbing the increase in the magnetic attraction force. Since the force (torque) to rotate the rotor is determined mainly by the magnetic attraction force between a rotational direction-facing end portion of the projected pole of the rotor and an end portion of the pole portion of the stator, the aforementioned curb on the increase in the magnetic attraction force provided by the feeble-magnetic portion does not remarkably reduce the torque of the SR motor. Thus the switched reluctance motor of the invention is able to reduce the magnetic attraction force occurring at the time of energization switching with a simple construction while ensuring generation of a desired amount of torque.

The above and other objects, features and advantages of the present invention will be more apparent and more readily appreciated from the following detailed description of preferred exemplary embodiment of the present invention, taken in connection with the accompanying drawings.

BRIEF DESCRIPTION OF THE DRAWINGS

FIG. 5 shows characteristic curves indicating the relationship of the magnetic attraction force to the rotor angle of a switched reluctance motor according to the present invention and a conventional switched reluctance motor.

FIG. 6 shows characteristic curves indicating the relationship of the noise to the motor operating speed of a switched reluctance motor according to the present invention and a conventional switched reluctance motor.

DETTAILED DESCRIPTION OF THE INVENTION

Preferred embodiments of the switched reluctance motor of the present invention will be described in detail hereinafter with reference to the accompanying drawings.

Figure 1:
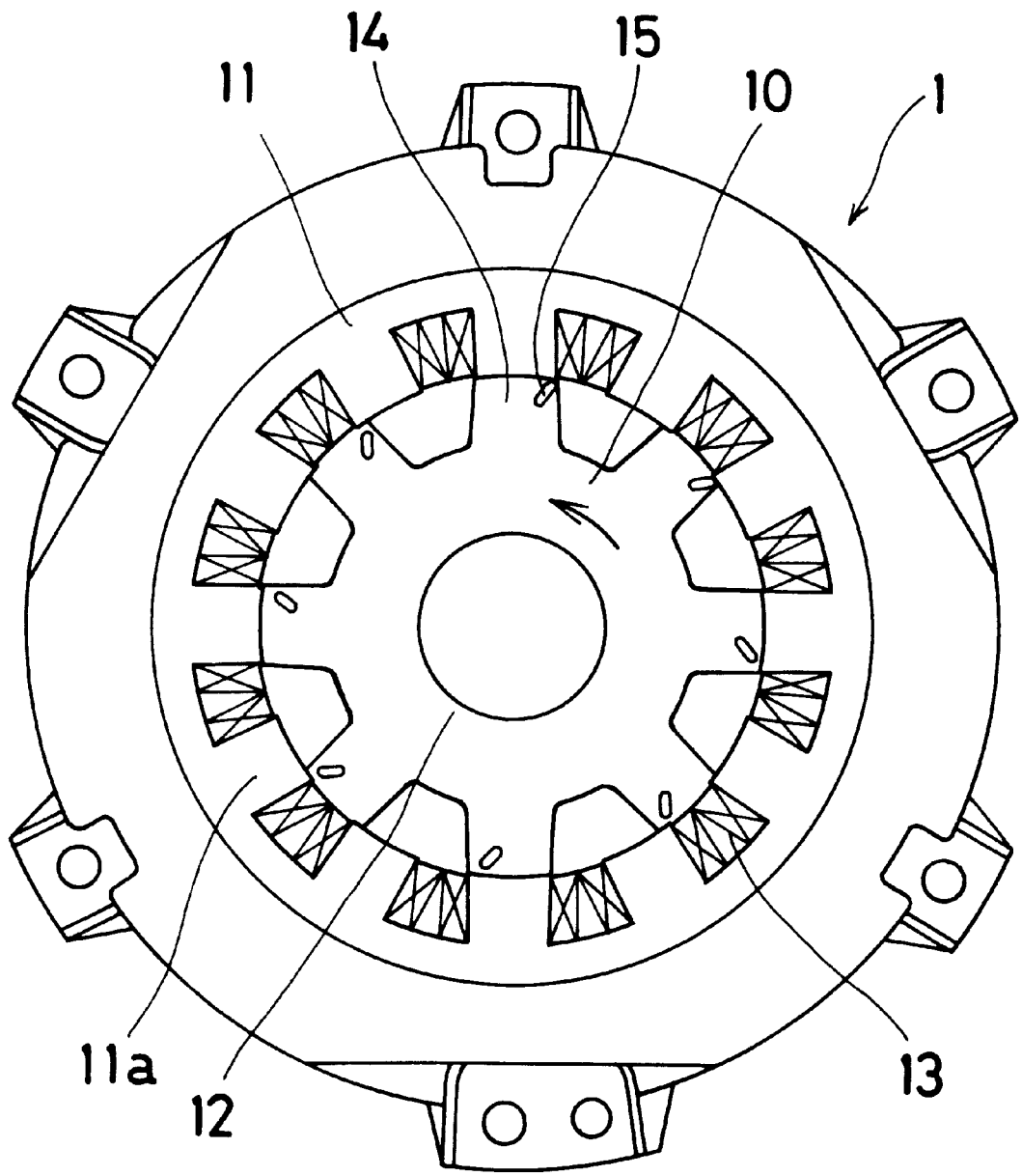
FIG. 1 is a schematic sectional view of a first preferred embodiment of the switched reluctance motor of the present invention.
Figure 2:
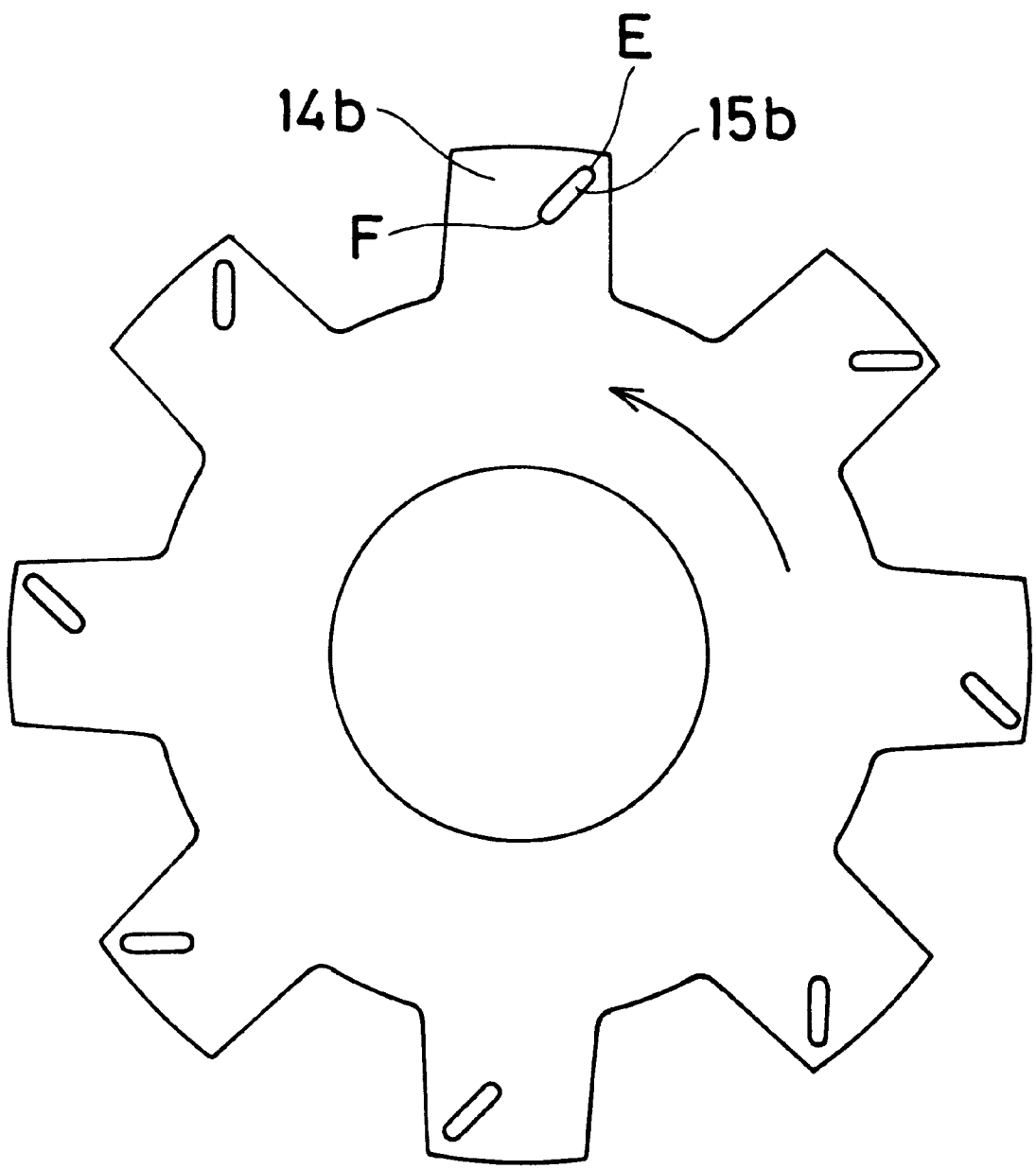
FIG. 2 is an end elevational view of a rotor according to the first embodiment shown in FIG. 1.

The SR motor has twelve pole portions in the stator and eight projected poles in the rotor. Referring to FIGS. 1 and 2, the SR motor 1 according to a first preferred embodiment has a stator 11 formed from a stack of annular magnetic steel plates. The stator 11 has six pairs of pole portions 11a that extend in the direction of an axis of the stator 11 and are projected from the inner peripheral face of the stator 11 in such a manner that each pair of pole portions are located opposite each other. The stator 11 is fixed by thermally fitting an outer peripheral portion thereof into a hollow portion of a housing. Six pairs of oppositely-disposed pole portions 11a are divided into three groups of two pairs and the pole portions 11a of each group are provided with interconnected coil windings 13, thereby forming a three-phase construction.

A rotor 10 is formed from a stack of magnetic steel plates and disposed inside the stator 11. The rotor 10 defines a central hole extending on an axis of the rotor 10 into which a rotary shaft 12 is fitted and fixed. The rotary shaft 12 is rotatably supported to side housings (not shown) by bearings. The rotor 10 is thereby rotatable together with the rotary shaft 12 inside the stator 11. The rotor 10 has four pairs of projected poles 14 that are equidistantly spaced so that each pair of projected poles 14 are projected radially outward in opposite directions. The projected poles 14 extend in the direction of the axis of the rotor 10. When the projected poles 14 face the pole portions 11a during rotation of the rotor 10, each projected pole 14 maintains a predetermined clearance from the facing pole portion 11a as can be seen in FIG. 1. According to this embodiment, the rotor 10 rotates counterclockwise in FIG. 1. Each projected pole 14 of the rotor 10 has a feeble-magnetic portion 15 that is weaker in magnetism than the material of the rotor 10 and which is located at a radially outer end side and near or at a side facing in the clockwise direction, i.e., the direction opposite to the rotational direction of the rotor 10.

As shown in FIG. 2, the feeble-magnetic portion of each projected pole 14b is formed as an elongated circle-shaped groove 15b extending from a point E relatively close to a radially outer end of the projected pole 14b and to an end thereof facing in the clockwise direction, i.e., the counter-rotational direction, to a point F relatively close to a radially inner end of the projected pole 14b and to an end thereof facing in the counterclockwise direction, i.e., the rotational direction. The grooves 15b do not need to have an elongated circular shape but may have an elliptical shape.

Figure 3:
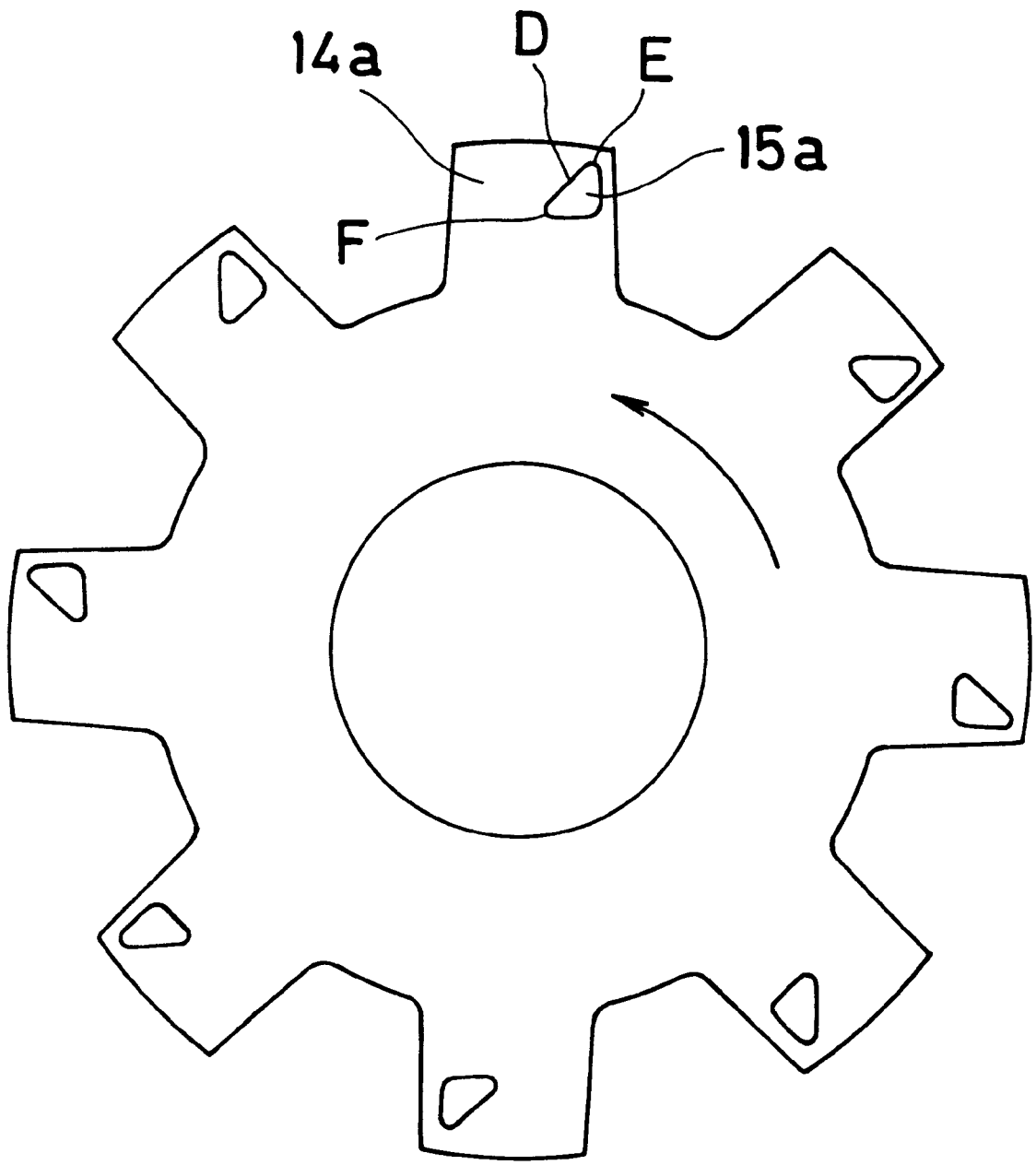
FIG. 3 is an end elevational view of a rotor according to a second preferred embodiment of the switched reluctance motor of the present invention.

FIG. 3 illustrates a second preferred embodiment of the present invention. According to the second embodiment, each feeble-magnetic portion is formed as a generally triangular hole 15a that has a side D extending from a point E relatively close to a radially outer end of the projected pole 14a and to a counter-rotational direction-facing end of the projected pole 14a, to a point F located radially inward and relatively close to a rotational direction-facing end of the projected pole 14a. The corners of each triangular hole 15a may be rounded as shown in FIG. 3.

The present invention is not limited to the foregoing embodiments. The feeble-magnetic portions may have any shape as long as the shape has a side extending radially inward approximately in the rotational direction from a position relatively close to a radially outer end and a counter-rotational direction-facing end of a projected pole and extends radially inward approximately in the counter-rotational direction. Although the side extending radially inward approximately in the rotational direction from a position relatively close to a radially outer, end and a counter-rotational direction-facing end of a projected pole is preferably straight, the side does not need to be completely straight but may be curved or formed in any other suitable configuration.

According to the foregoing embodiments, the grooves 15b or the holes 15a are weaker in magnetism than the other portions of the projected poles 14 and therefore serve as feeble-magnetic portions 15. It is also possible to secure non-magnetic high-electric resistant members 16b or 16a in the grooves 15b or the holes 15a, respectively.

The operation of the embodiments will be described in comparison with a conventional SR motor.

When a coil 13 is energized, a magnetic attraction force occurs between a projected pole 14 of the rotor 10 and a pole portion 11a of the stator 11. Due to a component of the magnetic attraction force, a torque acts on the rotor 10 so that the projected pole 14 faces the pole portion 11a. By switching energization of the coils 13, a torque continually acts on the rotor 10 thereby continuing rotating the rotor 10.

Figure 4:
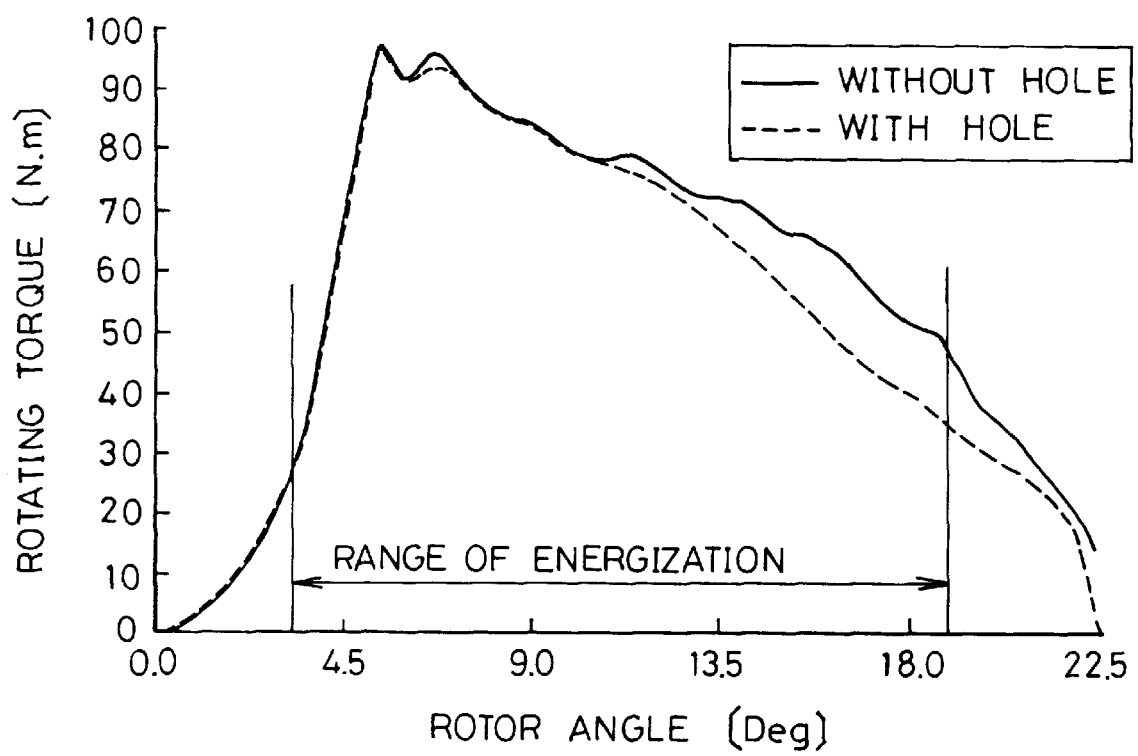
FIG. 4 shows characteristic curves indicating the relationship of the torque to the rotor angle of a switched reluctance motor according to the present invention and a conventional switched reluctance motor.

FIGS. 4 and 5 indicate the relationship between the rotor angle and the rotating torque and the relationship between the rotor angle and the magnetic attraction force. In the graphs of FIGS. 4 and 5, a rotor angle of 0° is defined at a position of the rotor 10 at which a pole portion 11a of the stator 11 is at a mid point between two neighboring projected poles 11a. Therefore, the position of the rotor 15 where a projected portion 14 exactly aligns with or faces the pole portion 11a becomes 22.5°. The solid line and broken line curves in FIGS. 4 and 5 indicate a conventional reluctance motor (without holes) and a switched reluctance motor according to the invention (with holes), respectively.

As indicated in FIGS. 4 and 5, the torque and the magnetic attraction force increase with rotation of the rotor 10 during a period between a time at which a rotational direction-facing end portion of a projected pole 14 of the rotor 10 overlaps an end portion of the pole portion 11a of the stator 11 and a time at which the feeble-magnetic portion 15 of the projected pole 14 overlaps (faces) the pole portion 11a, since the projected pole 14 is not blocked or interfered with by the feeble-magnetic portion 15 during that period. The torque reaches a peak before the feeble-magnetic portion 15 overlaps (faces) the pole portion 11a of the stator 11 and then gradually decreases as indicated in FIG. 4 since the torque is produced by a component of the magnetic attraction force acting on the projected pole 14 of the rotor 10, as mentioned above.

The magnetic attraction force increases as the areas of the projected pole 14 and the pole portion 11 that face each other increases with rotation of the rotor 10, as indicated in FIG. 5. However, the increase of the magnetic flux contributing to an increase of the magnetic attraction force is curbed by the feeble-magnetic portion 15. More specifically, when a counter-rotational direction-facing end portion of the projected pole 14 overlaps an end portion of the pole portion 11a of the stator 11, the magnetic flux extending in the projected pole 14 of the rotor 10 is blocked by the feeble-magnetic portion 15 thus curbing the increase of the magnetic attraction force. The magnetic attraction force at the time of energization switching is thereby reduced to about 4250 kgf from a conventional value of about 5000 kgf. The torque is mainly determined by a component of the magnetic attraction force between a rotational direction-facing end portion of the projected pole 14 of the rotor 10 and an end portion of the pole portion 11a of the stator 11. Since the feeble-magnetic portion 15 has a shape extending radially inward approximately in the rotational direction from a position relatively close to a counter-rotational direction-facing end and a radially outer end of the projected pole, or a shape that has a side extending radially inward approximately in the rotational direction from a position relatively close to a counter-rotational direction-facing end and a radially outer end of the projected pole, as shown in FIGS. 2 and 3, the feeble-magnetic portion 15 does not considerably reduce the magnetic flux that contributes to the component of the magnetic attraction force that causes the projected pole 14 to move to face the pole portion 11a. Therefore, the curb on the increase of the magnetic attraction force achieved by the feeble-magnetic portion does not involve a significant reduction of the torque. The torque decreased by only several percent from the torque produced by the conventional art (having no feeble-magnetic portion). In FIG. 4, the torque is indicated by an area within the range of energization.

By forming a feeble-magnetic portion 15 into a shape extending radially inward approximately in the rotational direction from a position relatively close to a counter-rotational direction-facing end and a radially outer end of the projected pole, or a shape that has a side extending radially inward approximately in the rotational direction from a position relatively close to a counter-rotational direction-facing end and a radially outer end of the projected pole, it becomes possible to reduce the magnetic attraction force occurring at the time of switching the coils 13 to be energized while maintaining generation of a desired amount of torque. The embodiments thus produce a necessary torque without increasing the number of winding turns of the coils 13 to increase the torque. Increasing the number of winding turns would increase the weight and cost of the SR motor. The reduction of the maximum magnetic attraction force occurring at the time of energization switching will restrain generation of noises resulting from vibrations produced by large changes (maximum to 0) in the magnetic attraction force at the time of energization switching. FIG. 6 indicates the relationship between the noise and the motor operating speed of SR motors according to conventional prior art motors and the present invention. As indicated by the graph of FIG. 6, the present invention reduces noises over the entire operation range. During the noise measurement indicated in FIG. 6, it was confirmed that the difference between the power inputs to the SR motors according to the conventional art and the present invention was small and the torque reduction of the SR motor according to the invention was small.

The embodiments reduce the magnetic attraction force occurring immediately before energization switching by a simple construction. The feeble-magnetic portions 15 formed as the grooves 15a or the holes 15b cut in the projected poles 14 of the rotor 10 are easy to form and will not require a significant cost increase.

If the feeble-magnetic portion 15 of a projected pole 14 of the rotor 10 is formed as a groove 15a or a hole 15b extending through the projected hole, and a non-magnetic high-electric resistant member extends through the groove or the hole, the strength of the rotor 10 formed from a stack of steel plates will be increased. It is also possible to adjust rotational imbalance of the rotor 10 by using non-magnetic high-electric resistant members. In addition, incorporation of the non-magnetic high-electric resistant members will reduce the effect of eddy currents occurring in the rotor 10.

Although each of the switched reluctance motors according to the embodiments has a stator having six pairs of pole portions and a rotor having four pairs of projected poles, the present invention may also be applied to other types of motors, for example, a switched reluctance motor provided with a stator having three pairs of pole portions and a rotor having two pairs of projected poles. As understood from the above description, the switched reluctance motor of the present invention reduces vibrations and noises without increasing weight or cost or reducing efficiency.

Since a switched reluctance motor according to the present invention employs a feeble-magnetic portion of a shape that has a side extending radially inward approximately in the rotational direction from a point relatively close to a counter-rotational direction-facing end and a radially outer end of the projected pole, the switched reluctance motor considerably reduces the magnetic attraction force occurring at the time of energization switching without significantly reducing the total torque thereby restraining generation of noises resulting from vibrations produced by large changes in the magnetic attraction force at the time of energization switching. These advantages can be provided without a cost increase by, for example, forming the feeble-magnetic portions as grooves or holes in the projected poles of the rotor.

If the feeble-magnetic portion is formed as a groove or a hole in a projected pole of the rotor and a non-magnetic high-electric resistant member extends through the groove or the hole, the switched reluctance motor of the invention will achieve further stable performance. Furthermore, if the present invention has a construction wherein the rotor is formed from a stack of magnetic material plates and the feeble-magnetic portion is formed by a groove or a hole formed in a projected pole of the rotor and a non-magnetic high-electric resistant member extends through the groove or the hole in the plurality of magnetic material plates, the strength of the rotor will increase and adjustment of a rotational imbalance of the rotor will become possible.

While the invention has been particularly shown and described with reference to preferred embodiments thereof, it will be understood by those in the art that the foregoing and other changes in form and details may be made therein without departing from the spirit and scope of the invention.

The entire disclosure of Japanese Patent Application No. He 8-149184 filed on Jun. 11, 1996 including the specification, drawings and abstract is incorporated herein by reference in its entirety.

What is claimed is:

1. A switched reluctance motor that is operated mainly in a specific rotational direction, comprising:
    a stator having a plurality of pairs of pole portions that extend substantially in the direction of an axis of the stator and are projected radially inward in such a manner that each pair of pole portions are located opposite each other;
    a rotor rotatably disposed inside the stator, the rotor having a plurality of pairs of projected poles that extend substantially in the direction of an axis of the rotor and that are projected radially outward so that the projected poles may face the pole portions of the stator while maintaining a predetermined clearance therefrom;
    a plurality of coils wound around the plurality of pairs of the pole portions of the stator; and
    a feeble-magnetic portion formed inside of each of the projected poles of the rotor, in a shape extending radially inward approximately in the rotational direction, from a position relatively close to a radially outer end of the projected pole and to an end of the projected pole facing in a counter-rotational direction, the feeble-magnetic portion being weaker in magnetism than a material of the rotor.

2. A switched reluctance motor according to claim 1, wherein the feeble-magnetic portion is comprised of a groove formed in each of the projected poles of the rotor.

3. A switched reluctance motor that is operated mainly in a specific rotational direction, comprising:
    a stator having a plurality of pairs of pole portions that extend substantially in the direction of an axis of the stator and are projected radially inward in such a manner that each pair of pole portions are located opposite each other;
    a rotor rotatably disposed inside the stator, the rotor having a plurality of pairs of projected poles that extend substantially in the direction of an axis of the rotor and that are projected radially outward so that the projected poles may face the pole portions of the stator while maintaining a predetermined clearance therefrom;
    a plurality of coils wound around the plurality of pairs of the pole portions of the stator; and
    a feeble-magnetic portion formed in each of the projected poles of the rotor, in a shape extending radially inward approximately in the rotational direction, from a position relatively close to a radially outer end of the projected pole and to an end of the projected pole facing in a counter-rotational direction, the feeble-magnetic portion being weaker in magnetism than a material of the rotor;
    wherein the feeble-magnetic portion is comprised of a groove formed in each of the projected poles of the rotor and a non-magnetic high-electric resistant member extending through each groove.

4. A switched reluctance motor according to claim 3, wherein the rotor is comprised of a plurality of plates of magnetic material, and the non-magnetic high-electric resistant member extends through said plurality of plates.

5. A switched reluctance motor according to claim 1, wherein the feeble-magnetic portion is located at a counter-rotational direction-facing end side of each of the projected poles of the rotor.

6. A switched reluctance motor that is operated mainly in a specific rotational direction, comprising:
    a stator having a plurality of pairs of pole portions that extend substantially in the direction of an axis of the stator and are projected radially inward in such a manner that each pair of pole portions are located opposite each other;
    a rotor rotatably disposed inside the stator, the rotor having a plurality of pairs of projected poles that extend substantially in the direction of an axis of the rotor and that are projected radially outward so that the projected poles may face the pole portions of the stator while maintaining a predetermined clearance therefrom;
    a plurality of coils wound around the plurality of pairs of the pole portions of the stator; and
    a feeble-magnetic portion disposed inside of each of the projected poles of the rotor, and having a shape with a side extending radially inward substantially in the rotational direction from a point relatively close to a radially outer end of the projected pole and to an end of the projected pole facing in a counter-rotational direction and that extends radially inward approximately in the counter-rotational direction, the feeble-magnetic portion being weaker in magnetism than a material of the rotor.

7. A switched reluctance motor according to claim 6, wherein the feeble-magnetic portion is comprised of a hole formed in each of the projected poles of the rotor.

8. A switched reluctance motor that is operated mainly in a specific rotational direction comprising:
    a stator having a plurality of pairs of pole portions that extend substantially in the direction of an axis of the stator and are projected radially inward in such a manner that each pair of pole portions are located opposite each other;
    a rotor rotatable disposed inside the stator, the rotor having a plurality of pairs of projected poles that extend substantially in the direction of an axis of the rotor and that are projected radially outward so that the projected poles may face the pole portions of the stator while maintaining a predetermined clearance therefrom;
    a plurality of coils would around the plurality of pairs of the pole portions of the stator; and
    a feeble-magnetic portion disposed in each of the projected poles of the rotor, and having a shape with a side extending radially inward substantially in the rotational direction from a point relatively close to a radially outer end of the projected pole and to an end of the projected pole facing in a counter-rotational direction and that extends radially inward approximately in the counter-rotational direction, the feeble-magnetic portion being weaker in magnetism than a material of the rotor;
    wherein the feeble-magnetic portion is comprised of a hole formed in each of the projected poles of the rotor and a non-magnetic high-electric resistant member extending through each hole.

9. A switched reluctance motor according to claim 8, wherein the rotor is comprised of a plurality of plates of magnetic material and the non-magnetic high-electric resistant member extends through said plurality of plates.

10. A switched reluctance motor according to claim 6, wherein the feeble-magnetic portion is located at a counter-rotational direction-facing end side of each of the projected poles of the rotor.

* * * * *